(12) United States Patent
Chen (10) Patent No.: US 11,992,080 B2
(45) Date of Patent: May 28, 2024

(54) MANUFACTURING METHOD OF AN INJECTION MOLDED INTEGRAL MULTICOLOR THERMOPLASTIC ELASTOMETRIC FOAMED SOLE

(71) Applicant: Guangdong Angsi Advanced Materials Technologies Co., Ltd., Shantou (CN)

(72) Inventor: Xubin Chen, Shantou (CN)

(73) Assignee: GUANGDONG ANGSI ADVANCED MATERIALS TECHNOLOGIES CO., LTD., Shantou (CN)

(*) Notice: Subject to any disclaimer, the term of this patent is extended or adjusted under 35 U.S.C. 154(b) by 444 days.

(21) Appl. No.: 17/335,131

(22) Filed: Jun. 1, 2021

(65) Prior Publication Data

US 2021/0378357 A1    Dec. 9, 2021

(30) Foreign Application Priority Data

Jun. 6, 2020    (CN) .......................... 202010508783.X (51) Int. Cl.
*B29C 45/16*    (2006.01)
*A43B 13/02*    (2022.01)
(Continued)

(52) U.S. Cl.
CPC ............ *A43B 13/023* (2013.01); *A43B 13/04* (2013.01); *B29C 45/14795* (2013.01); *B29C 45/14811* (2013.01); *B29C 45/14819* (2013.01); *B29C 45/1671* (2013.01); *B29D 35/0009* (2013.01); *B29D 35/122* (2013.01);
(Continued)

(58) Field of Classification Search
CPC ..... A43B 1/0027; A43B 13/023; A43B 13/04; B29C 45/14795; B29C 45/14811; B29C 45/14819; B29C 45/1671; B29D 35/0009; B29D 35/122; B29D 35/142; B29K 2105/0005; B29K 2105/04; B29L 2031/504
See application file for complete search history.

(56) References Cited

FOREIGN PATENT DOCUMENTS

KR    19990045923    *    6/1999

* cited by examiner

*Primary Examiner* — Edmund H Lee
(74) *Attorney, Agent, or Firm* — McClure, Qualey & Rodack, LLP (57) ABSTRACT

An injection molded integral multicolor thermoplastic elastomeric foamed sole, comprising an integral sole made from thermoplastic elastomeric foaming bodies of at least two colors, and on surfaces thereof are provided grains of arbitrarily superposed injection strips; the foamed sole is made by: mixing, milling and heating thermoplastic elastomer raw materials of at least two colors, lubricants, and foaming auxiliaries to be thermoplastic elastomeric fused-masses, adding respectively gas-foaming agents at 0.2%-10% of thermoplastic elastomeric raw materials, compressive injecting gas-foaming agents respectively into thermoplastic elastomeric fused-masses, fully mixing to form thermoplastic elastomeric gas foamed polymers, and extruding foaming strips of thermoplastic elastomeric gas polymers of the at least two colors with an extrusion and injection process and/or co-extruding the foaming strips of thermoplastic elastomeric gas polymers of the at least two colors by a co-extrusion process into molds to form arbitrarily superposed strips, clamp molds, discharge gas and form.

5 Claims, 2 Drawing Sheets (51) Int. Cl.
*A43B 13/04* (2006.01)
*B29C 45/14* (2006.01)
*B29D 35/00* (2010.01)
*B29D 35/12* (2010.01)
*B29D 35/14* (2010.01)
*B29K 105/00* (2006.01)
*B29K 105/04* (2006.01)
*B29L 31/50* (2006.01)

(52) U.S. Cl.
CPC .... *B29D 35/142* (2013.01); *B29K 2105/0005* (2013.01); *B29K 2105/04* (2013.01); *B29L 2031/504* (2013.01)

MANUFACTURING METHOD OF AN INJECTION MOLDED INTEGRAL MULTICOLOR THERMOPLASTIC ELASTOMETRIC FOAMED SOLE

TECHNICAL FIELD

The present invention relates to fabrication technology of foamed soles, especially an injection molded integral multicolor thermoplastic elastomeric foamed sole and manufacturing method thereof.

BACKGROUND TECHNOLOGY

Adidas Boost foam midsole is made by fabricating engineered thermoplastic polyurethane (ETPU) pellets with thermoplastic polyurethane (TPU) materials, and by single forming with mold upon steam and cold press, and such a midsole has features such as being very flexible, structurally stable, of good resilience, fully foamed, and low density, However, due to properties of the ETPU pellets, for foamed soles made by ETPU pellets with such technology, there are usually dense grainy lines on surfaces thereof, which appear like cystosepiments, and may cause discomfort for some consumers due to trypophobia; furthermore, as manufacturing is done by single forming, when ETPU pellets of a variety of colors are loaded into the molds, pellet distribution can be uneven due to flowing and slipping of the ETPU pellets, and consequently, relatively standard color separation effects cannot be achieved effectively, as a result, most of soles in finished shoe bodies are of a single color, usually used as midsoles, or given additional treatment, to attach auxiliary sheets to the ETPU foamed soles and furnish finished soles with specialized functions or aesthetic features.

SUMMARY OF THE INVENTION

A purpose of the present invention is to provide an injection molded integral multicolor thermoplastic elastomeric foamed sole and manufacturing method thereof, in addition to being of moderate hardness, long-term stable structure, good resilience, fully foamed and low density, in the foamed soles made in this way there are isolated grains of arbitrarily folded injection strips, which will eliminate visual discomfort caused by dense grainy lines, and furthermore, relatively standard color separation effect can be achieved too.

To realize the abovementioned purpose, the present invention adopts the following technical solution:

An injection molded integral multicolor thermoplastic elastomeric foamed sole, characterized in that: the foamed sole is of a shape of an integral sole made from thermoplastic elastomeric foaming bodies of at least two color classifications, and on surfaces of the thermoplastic elastomeric foaming bodies of the at least two color classifications are provided grains of a plurality of arbitrarily superposed injection strips; the foamed sole is made by: mixing, milling and heating thermoplastic elastomeric raw materials of at least two color classifications, lubricants, and foaming auxiliaries to be thermoplastic elastomeric fused masses, adding respectively gas foaming agents at 0.2%-10% of the thermoplastic elastomeric raw materials of the at least two color classifications, compressive injecting the gas foaming agents respectively into the thermoplastic elastomeric fused masses, fully mixing to form thermoplastic elastomeric gas foamed polymers, and extruding respectively foaming strips of thermoplastic elastomeric gas polymers of the at least two color classifications with an extrusion and injection process and/or co-extruding the foaming strips of thermoplastic elastomeric gas polymers of the at least two color classifications by a co-extrusion process into molds so as to form a plurality of layers of arbitrarily superposed strips, clamp the molds, discharge gas and form.

Further, the foaming strips of thermoplastic elastomeric gas polymers are consisted of one to seven colors. Further still, the thermoplastic elastomeric raw materials are any one or a combination of TPU, TPEE, TPR, TPAE, and TPO; the gas foaming agents are any one or a combination of carbon dioxide, nitrogen, isobutene, isopentane, hexane, heptane and fluoro-gas.

Preferably, the thermoplastic elastomeric raw materials are TPU and at least one or a combination of TPEE, TPR, TPAE and TPO.

Preferably, the foaming auxiliaries are selected from materials that maintain foaming status of the thermoplastic elastomeric raw materials, namely azo compounds, pentafluoropropane, hydrochlorofluorocarbon foaming agents, hydrocarbon foaming agents, and heat expansion microcapsules, and an optimal adding amount of the same is 1%-5% of total weight of the thermoplastic elastomeric raw materials; more preferably, raw materials of the heat expansion microcapsules are F-190D and FN105 made by SAKAI company.

To improve surface smoothness of the thermoplastic elastomeric gas foaming polymers during extrusion, avoid partial cavitation, or fracture of fused masses, and to enhance visibility of the plurality of arbitrarily superposed injection strips formed among the foaming strips of the thermoplastic elastomeric gas polymers, an appropriate amount of lubricants are used during extrusion, the lubricants are any one or any combination of wax, talcum powder, nonpolar PE wax, oligomeric fatty acid esters, stearic acid and ethylene bistearic acid amide; preferably, the lubricants are chosen from wax, talcum powder, and nonpolar PE wax, and adding amount of the lubricants is preferably 1%-5% of total weight of the thermoplastic elastomeric raw materials.

Furthermore, density is 0.225-0.280 $g/cm^3$, hardness 40-60 C, and resilience 48%-80%.

Further still, grain density of the injection strips in surfaces of the foamed sole is 1-10 grains per $cm^3$.

The present invention has also disclosed a manufacturing method of the injection molded integral multicolor thermoplastic elastomeric foamed sole, comprising following steps:

S1: sending respectively thermoplastic elastomer raw materials of different color classifications, lubricants, and foaming auxiliaries to first milling machines of different color classifications, and milling the same in the first milling machines, forming thermoplastic elastomeric fused masses, in the meantime, adding gas foaming agents into the thermoplastic elastomeric fused masses in the first milling machines, maintain hot mixing and forming polymer-gas dispersoid systems;

S2: sending the polymer-gas dispersoid systems of different color classifications in S1 respectively to second milling machines of corresponding color classifications for cutting, cooling and pressurizing to form thermoplastic elastomeric gas foaming polymers, sending to injection molding machines of corresponding color classifications respectively, to have injection nozzles of the injection molding machines to extrude foaming strips of thermoplastic elastomeric gas polymers, and/or have the injection molding machines of at least two color classifications to supply a feeding port of a laminating machine and extrude the foaming strips of thermoplastic elastomeric gas polymers with at least one injection nozzle of the injection molding machines with co-extrusion technology; pouring quantitatively and simultaneously or sequentially the foaming strips of thermoplastic elastomeric gas polymers extruded by different injection nozzles of the injection molding machines into a female mold, and form a status of a plurality of arbitrarily superposed layers; and when pouring quantitatively into the female mold sequentially, temperature difference between next thermoplastic elastomeric gas foaming polymer and last thermoplastic elastomeric gas foaming polymer shall be ±10° C.

S3: After completing pouring of the foaming strips of thermoplastic elastomeric gas polymers of each of the different color classifications, matching the female mold and a male mold, discharge gas therein, and finalize to be the foamed sole.

Furthermore, the first milling machines are double screw extruders, and the second milling machines are single screw extruders.

Further still, in an enclosed cavity formed between the male mold and the female mold, at least two housing cavities for different color classifications of the foamed sole are provided by providing dividing grooves and/or dividing edges and/or dividing protrusions and/or dividing recesses.

Still further, in step S2 and S3, pouring of the foaming strips of thermoplastic elastomeric gas polymers of each of the different color classifications is done within 60 s.

Further still, an area of openings of the injection nozzles of the injection machines is 0.5 mm² to 100 mm².

BENEFICIAL EFFECTS OF THE PRESENT INVENTION

1. There are unique extrusion injection grains and isolation strips in the thermoplastic elastomeric foaming sole produced according to the present invention, which is of outstanding characters and styles, and has eliminated visual displeasure resulted from dense grainy lines of ETPU grain foaming soles; in addition, a visual style of the foaming sole is from apparently divided however randomly distributed colors and strips, with relatively standard color division, which comes out to be a more pleasant visual style or brings a visual perception combining two styles.
2. Inside the foaming sole made according to the production method disclosed in the present invention, there are uniformly distributed minor pores and no hollow pores that may affect structural stability and strength are present, therefore, while the density is quite low, the physical performance can be maintained for a long term, and the foaming sole is not susceptible to damage and service life thereof is long, while being environmentally friendly and recyclable.
3. As the foaming sole is fully foamed, hardness thereof is medium, which renders soft texture to a foot, fits the foot sole better and relieves foot pinching feelings effectively, making it comfortable to wear and walk; furthermore, a good resilience property provides excellent shock absorption ability and high energy return is provided by the sole, and motion energy consumption is reduced; therefore, the foaming sole can be used to replace common filled air cushion, and provides better cushioning and shock absorption effects.
4. Fabrication technology of the foaming sole is simplified, with less fabrication procedures and a lower product defect rate, and the fabrication can be done by automatic fabrication facilities, therefore, fabrication cost is effectively reduced; use of glues or other chemical fasteners can be avoided with some fabrication technology, so use of such adhesives are potentially reduced; in the meantime, when using the foaming sole as a midsole, by attaching other property enhancing materials, corresponding properties can be obtained.

EMBODIMENTS

The subject matter of the embodiments of the present invention is specifically described herein to meet the statutory requirements, but the description is not intended to limit the scope of the claims. The claimed subject matter can be embodied in other ways, can include different elements or steps, and can be used in combination with other existing or coming technologies. Except when individual steps or settings or the order of elements are specifically described, the description should not be construed as implying a specific order between various steps or elements.

Certain embodiments of the present invention are described in the following detailed description with reference to sports shoes. For example, some of the embodiments described herein may be applicable to sports that require lateral movement, such as tennis, basketball, football, badminton, and the like. However, it is emphasized that even in light of such facts, the present invention is not limited to these embodiments. On the contrary, the present invention can also be applied to, for example, longitudinal sports shoes and lateral sports shoes, such as basketball shoes, golf shoes, football shoes, hiking shoes or dancing shoes, and other kinds of sports shoes or traditional walking shoes.

In addition, there are many technical implementations, and some of the implementations of the present invention that can be imagined are to be described in more details below. However, the present invention is not limited to the embodiments specifically described herein.

Embodiment 1

Figure 1:
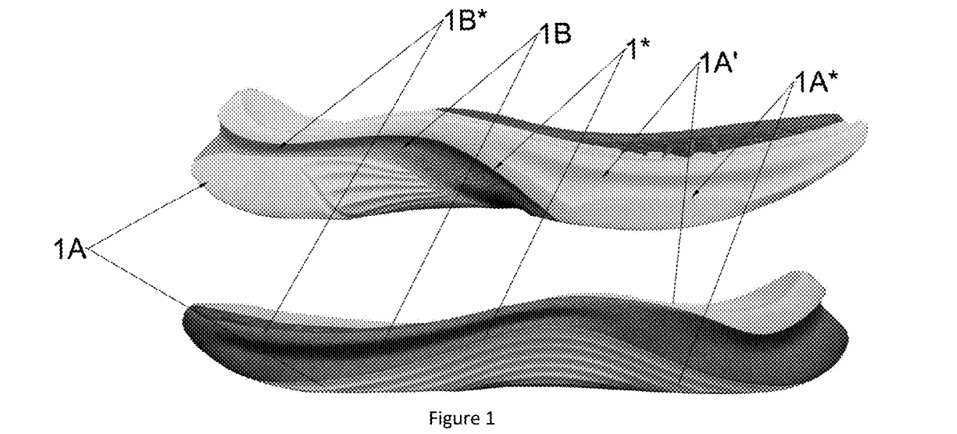
FIG. 1 is a photographic diagram of the foaming sole according to Embodiment 1 of the present invention.

As is shown in FIG. 1, the present invention discloses a manufacturing method of an injection molded integral multicolor thermoplastic elastomeric foamed sole, comprising following steps:

In the present embodiment, ingredients of color classification A are as follows:

Thermoplastic elastomeric raw materials A: TPU (thermoplastic polyurethane elastomer);

Lubricant A: talcum powder;
Foaming auxiliaries A: Sakai F-190D;
Gas foaming agent A: $CO^2$ and/or isopentane;
Wherein, addition percentage of the lubricant A, the foaming auxiliaries A, and the gas foaming agent A is calculated by total weight of the thermoplastic elastomeric raw materials A;
Ingredients of color classification B is as follows:
Thermoplastic elastomeric raw materials B: calculating by mass ratio, TPU (thermoplastic polyurethane elastomer): TPEE (thermoplastic polyester elastomer)=3:1;
Lubricant B: wax;
Foaming auxiliaries B: SaKai FN-105;
Gas foaming agent B: $CO^2$ and/or isopentane;
Wherein, addition percentage of the lubricant B, the foaming auxiliaries B, and the gas foaming agent B is calculated by total weight of the thermoplastic elastomeric raw materials B;
A range of mass ratio of the raw materials is shown in table 1, and manufacturing is done according to specifications stipulated in table 2, and specifically in the following manner:
S1: sending the thermoplastic elastomeric raw materials, the lubricant and foaming auxiliaries of color classification A as specified in Table 1 to a double screw extruder A of color classification A, milling the same in the double screw extruder A, and forming thermoplastic elastomeric fused mass A, in the meantime, infusing the gas foaming agent A into the thermoplastic elastomeric fused mass A in the double screw extruder A, maintain a hot mixing state, and forming a polymer-gas dispersoid system A;
Furthermore, sending the thermoplastic elastomeric raw materials, the lubricant and the foaming auxiliaries of color classification B as specified in Table 1 to a double screw extruder B of color classification B, milling the same in the double screw extruder B, and forming thermoplastic elastomeric fused mass B, in the meantime, infusing the gas foaming agent B into the thermoplastic elastomeric fused mass B in the double screw extruder B, maintain a hot mixing state and forming a polymer-gas dispersoid system B;
S2: sending the polymer-gas dispersoid system A in S1 to a single screw extruder A for cutting, cooling and pressurizing to form thermoplastic elastomeric gas foaming polymers A, cooling until temperature is $T_A$, $T_{MA}-15°C. \leq T_A \leq T_{MA}+20°C.$ ($T_{MA}$ stands for a fusion point of the thermoplastic elastomeric raw materials A), sending to an injection molding machine A, and extruding foaming strips A of thermoplastic elastomeric gas polymers with an intercepting perforated nozzle, with an area of 16 $mm^2$, of the injection molding machine A and at a temperature of $T_A$;
Sending the polymer-gas dispersoid system B in S1 to a single screw extruder B for cutting, cooling and pressurizing to form thermoplastic elastomeric gas foaming polymer B, cooling until the temperature is $T_B$, $T_{MB}-15°C. \leq T_B \leq T_{MB}+20°C.$ ($T_{MB}$ is a mixed melting point of the thermoplastic elastomer raw materials B), sending to the injection molding machine B, extruding foaming strips B of thermoplastic elastomeric gas polymers at a temperature of $T_B$ with an intercepting single-hole injection nozzle of the injection molding machine B with an area of an opening of the injection nozzle 16 $mm^2$ and controlling a temperature difference between $T_A$ and $T_B$ to be ±10° C.

Figure 2:
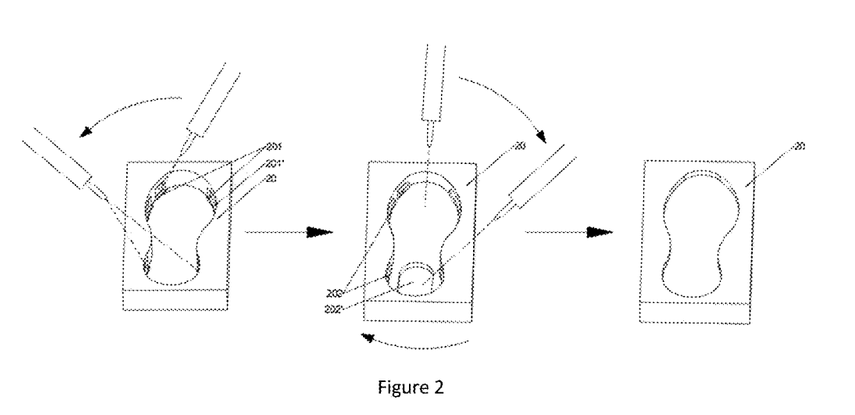
FIG. 2 is a diagram showing quantitative pouring of the foaming strips A, B and C of thermoplastic elastomeric gas polymers into a female mold according to Embodiment 2 of the present invention.

Pouring correspondingly and quantitatively the foaming strips A of thermoplastic elastomeric gas polymers into a lower part of heel and a lower part of an outer border of vamp of the female mold, during extrusion, moving the female mold against the intercepting perforating injection nozzle of the injection molding machine A to have surfaces of the thermoplastic elastomeric gas polymer foaming body A to be in a state of multiple arbitrarily superposed layers, and reaches a state as shown in FIG. 2A at the collaborative effort of the dividing grooves, dividing edges, dividing protrusions and dividing recesses on the mold and the wall hanging properties of foaming strips A of thermoplastic elastomeric gas polymers; thereafter, extruding and pouring quantitatively the foaming strips B of thermoplastic elastomeric gas polymers into an intermediate part of heel and an inner border of the vamp in the female mold, and forming a status as shown in FIG. 2B at the collaborative effort of the dividing grooves, dividing edges, dividing protrusions and dividing recesses on the mold and the wall hanging properties of foaming strips B of the thermoplastic elastomeric gas polymers; thereafter, extruding and pouring the foaming strips A of thermoplastic elastomeric gas polymers correspondingly and quantitatively into an intermediate part of heel and an upper part of the outer border of vamp of the female mold, and during extrusion, moving the female mold against the intercepting perforated injection nozzle of the injection molding machine A, so that surfaces of the poured foaming strips A of thermoplastic elastomeric gas polymers appear visually to be in a state of multiple arbitrarily superposed layers, and reach a state as shown in FIG. 1A at the collaborative effect of the dividing grooves, dividing edges, dividing protrusions and dividing recesses on the mold and the wall hanging properties of the foaming strips A of the thermoplastic elastomeric gas polymers;

S3: after pouring the foaming strips of thermoplastic elastomeric gas polymers of all the color classifications, matching the male mold and the female mold, discharging gas therein, and shaping to be the foaming sole, and characteristics of the product group (1) to (4) are shown in Table 3. And as shown in FIG. 1, in the foaming sole made by foaming in this way, degree of density of the injection strip grains (1A* and 1B*) of parts perfused corresponding by the foaming strips A of thermoplastic elastomeric gas polymers, namely the lower part of heel and the lower part of outer border of vamp 1A, and the upper part of heel and the upper part of inner border of vamp 1A' and those of parts perfused correspondingly by the foaming strips B of thermoplastic elastomeric gas polymers, namely the intermediate part of heel and the upper part of outer border of vamp 1B, are consistent and visually, appearance of the injection strip grains is sparse (about 3-6 lines/$cm^2$); and at the collaborative effect of the dividing grooves, dividing edges, dividing protrusions and dividing recesses on the molds and the wall hanging properties of the foaming strips of thermoplastic elastomeric gas polymers, among 1A, 1B and 1A' there are relatively apparent color dividing lines 1*.

TABLE 1

Ingredient content in Embodiment 1

| | Lubricants A | Foaming auxiliaries A | Gas foaming agent A |
|---|---|---|---|
| Group (1) | 2% | 2% | $CO_2$ 3% |
| Group (2) | 3% | 1% | $CO_2$ 3% + isopentane 1% |
| Group (3) | 2% | 4% | $CO_2$ 2% + isopentane 3% |
| Group (4) | 1% | 5% | $CO_2$ 5% |

TABLE 1-continued

Ingredient content in Embodiment 1

| | Lubricants B | Foaming auxiliaries B | Gas foaming agent B |
|---|---|---|---|
| Group (1) | 2.5% | 2% | $CO_2$ 3% |
| Group (2) | 2% | 1% | $CO_2$ 3% + isopentane 1% |
| Group (3) | 3% | 4% | $CO_2$ 2% + isopentane 3% |
| Group (4) | 1.5% | 5% | $CO_2$ 5% |

TABLE 2

Equipment specifications in Embodiment 1

| | Extrusion temp. of double screw extruder A (° C.) | Outlet pressure of double screw extruder A (MPa) | Temperature of single screw extruder A $T_A$ (° C.) |
|---|---|---|---|
| Group (1) | 220 | 3 | 190 ± 2 |
| Group (2) | 220 | 5 | 190 ± 2 |
| Group (3) | 200 | 5 | 185 ± 2 |
| Group (4) | 200 | 8 | 185 ± 2 |

| | Extrusion temp. of double screw extruder B (° C.) | Outlet pressure of double screw extruder B (MPa) | Temperature of single screw extruder B $T_B$ (° C.) |
|---|---|---|---|
| Group (1) | 200 | 3 | 185 ± 2 |
| Group (2) | 200 | 5 | 185 ± 2 |
| Group (3) | 180 | 5 | 175 ± 2 |
| Group (4) | 180 | 6 | 175 ± 2 |

TABLE 3

Product specifications and parameters in Embodiment 1

| | Density of foaming sole part A and A' | Hardness of part A and A' (Shore C) | Deformation rate of part A and A' (%) | Resilience rate of part A and A' (%) | Injection strips Density in part A and A' (line/cm$^2$) | Light fastness of part A and A' | Shock cushioning property G value of part A and A' |
|---|---|---|---|---|---|---|---|
| Group (1) | 0.265 | 45~60 | 24 | 52~68 | 8 | 4 | 12.5 |
| Group (2) | 0.276 | 48~60 | 24 | 52~68 | 9 | 4 | 12 |
| Group (3) | 0.243 | 40~60 | 23 | 48~68 | 8 | 3-4 | 14 |
| Group (4) | 0.235 | 42~60 | 21 | 48~68 | 8 | 3-4 | 13.5 |

| | Density of foaming sole part B | Hardness of part B (Shore C) | Deformation rate of part B (%) | Resilience rate of part B (%) | Injection strips Density in part B (line/cm$^2$) | Light fastness of part B | Shock cushioning property G value of part B |
|---|---|---|---|---|---|---|---|
| Group (1) | 0.253 | 42~50 | 25 | 70~80 | 3 | 4 | 13 |
| Group (2) | 0.269 | 42~50 | 24 | 70~80 | 3 | 4 | 13 |
| Group (3) | 0.233 | 40~50 | 24 | 65~80 | 3 | 4 | 14 |
| Group (4) | 0.230 | 40~50 | 22 | 65~80 | 2 | 4 | 13.5 |

Embodiment 2

Figure 3:
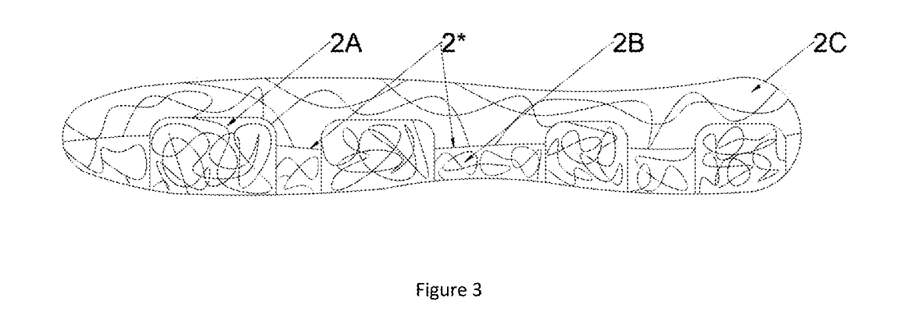
FIG. 3 is a diagram showing a side of the foaming sole according to Embodiment 2 of the present invention.

As shown in FIG. 2 to FIG. 3, the present invention discloses a manufacturing method of injection molded integral multicolor thermoplastic elastomeric foaming sole, comprising following steps:

In the present embodiment, ingredients of color classification B and color classification A are as following:
Thermoplastic elastomer raw materials A: calculated by weight by percentage, TPO (thermoplastic polyester elastomer): TPEE (thermoplastic polyester elastomer)=4:1;
Lubricants A: wax;
Foaming auxiliaries A: SaKai FN-100;
Gas foaming agents A: nitrogen, carbon dioxide, and dimethyl ether;
Wherein, addition percentage of the lubricants A, the foaming auxiliaries A and the gas foaming agents A are calculated by total weight of the thermoplastic elastomer raw materials A;
Thermoplastic elastomer raw materials B: TPU (thermoplastic polyurethane elastomer);
Lubricants B: talcum powder;
Foaming auxiliaries B: SaKai F-190D;
Gas foaming agents B: Carbon dioxide and/or dimethyl ether;
Wherein, addition percentage of the lubricants B, foaming auxiliaries B and gas foaming agents B are calculated by total weight of the thermoplastic elastomer raw materials B;
Ingredients of color classification C are as followings:
Thermoplastic elastomer raw material C: calculated by weight by percentage, TPU (thermoplastic polyurethane elastomer) and TPEE (thermoplastic polyester elastomer)=1:3;
Lubricants C: wax;
Foaming auxiliaries C: SaKai F-190D;
Gas foaming agents C: carbon dioxide and/or nitrogen and/or dimethyl ether;
Wherein, addition percentage of the lubricants C, foaming auxiliaries C and gas foaming agents C are calculated by total weight of the thermoplastic elastomer raw materials C;
Manufacturing with proportion of the foregoing ingredients as stipulated in Table 4, according to equipment specifications and parameters stipulated in Table 5 and as per the following steps S1-S3:
S1: sending the thermoplastic elastomer raw materials, the lubricants and the foaming auxiliaries as per specifications of color classification A in Table 4 to a double screw extruder A of color classification A, milling the same in the double screw extruder A to form thermoplastic elastomeric fused mass A, in the meantime, infusing the gas foaming agents A into the thermoplastic elastomeric fused mass A in the double screw extruder A as per a volume ratio between the gas foaming agents A and the thermoplastic elastomeric fused mass A and maintain hot mixing to form a polymer-gas dispersoid system A of each color classification;
Furthermore, adding the thermoplastic elastomer raw materials, the lubricants and the foaming auxiliaries as per specifications of color classification B stipulated in Table 4 to a double screw extruder B of color classification B, milling the same in the double screw extruder B to form thermoplastic elastomeric fused mass B, in the meantime, infusing the gas foaming agents B into the thermoplastic elastomeric fused mass B in the double screw extruder B as per a volume ratio between the gas foaming agents B and the thermoplastic elastomeric fused mass B and maintaining hot mixing, to form a polymer-gas dispersoid system B of each color classification;
And adding the thermoplastic elastomer raw materials, the lubricants and the foaming auxiliaries as per specifications of color classification C in Table 4 to a double screw extruder C of color classification C, milling the same in the double screw extruder C to form the thermoplastic elastomeric fused mass C, in the meantime, adding the gas foaming agents C into the thermoplastic elastomeric fused mass C in the double screw extruder C as per a volume ratio of the gas foaming agents C and the thermoplastic elastomer C, and maintaining hot mixing to form a polymer-gas dispersoid system C of each color classification;
S2: sending the polymer-gas dispersoid system A in S1 to a single screw extruder A for cutting, cooling and pressurizing to form the thermoplastic elastomeric gas foaming polymers A, cooling until the temperature is $T_A$, $T_{MA}-15°$ C.$\leq T_A \leq T_{MA}+20°$ C. ($T_{MA}$ is a melting point of the thermoplastic elastomer raw materials A), sending the same to an injection molding machine A, and extruding foaming strips A of thermoplastic elastomeric gas polymers with an intercepting perforated nozzle with an area of 4 $mm^2$ of the injection molding machine A and an extruding temperature $T_A$;
Sending the polymer-gas dispersoid system B in S1 to a single screw extruder B for cutting, cooling and pressurizing to form the thermoplastic elastomeric gas foaming polymers B, cooling until the temperature is $T_B$, $T_{MB}-15°$ C.$\leq T_B \leq T_{MB}+20°$ C. ($T_{MB}$ is a melting point of the thermoplastic elastomer raw materials B), sending the same to an injection molding machine B, and extruding foaming strips B of thermoplastic elastomeric gas polymers with an intercepting perforated nozzle with an area of 4 $mm^2$ of the injection molding machine B and an extruding temperature $T_B$;
Sending the polymer-gas dispersoid system C in S1 to a single screw extruder C for cutting, cooling and pressurizing to form the thermoplastic elastomeric gas foaming polymers C, cooling until the temperature is $T_C$, $T_{MC}-15°$ C.$\leq T_C \leq T_{MC}+20°$ C. ($T_{MC}$ is a melting point of the thermoplastic elastomer raw materials C), sending the same to an injection molding machine C, and extruding foaming strips C of thermoplastic elastomeric gas polymers with an intercepting perforated nozzle with an area of 4 $mm^2$ of the injection molding machine C and an extruding temperature $T_C$;
As is shown in FIG. 2, in the present embodiment, dividing edges 201 are respectively provided at the joint between the surrounding wearing sheet parts and the lower sole part of the female mold 20 of each sole, therefore, housing cavities 201' are formed in the surrounding wearing sheet parts of each sole; during extrusion, keeping position of the female mold 20 relatively fixed, and taking advantage of wall-hanging properties of the foaming strips A of thermoplastic elastomeric gas polymers, moving the intercepting perforated nozzle of the injection molding machine A with a foreign displacement device, pouring extruded foaming strips A of thermoplastic elastomeric gas polymer correspondingly and quantitatively into the housing cavities 201' in the surrounding wearing sheet parts and the lower sole parts in the female mold 20, completing the pouring action of the foaming strips A of thermoplastic elastomeric gas polymers within 2 seconds to form an area A, and the surfaces of the poured thermoplastic elastomeric gas polymer foaming bodies A appear to be in an arbitrarily superposed state;

After completing pouring of the thermoplastic elastomeric gas polymer foaming bodies A, pouring the foaming strips B of thermoplastic elastomeric gas polymers into a half sole part and intermediate part of the heel of the sole in the female mold 20, during extrusion, moving the intercepting perforated nozzle of the injection molding machine B and the female mold 20 with a foreign displacement device, so that a relative movement happens between the intercepting perforated nozzle of the injection molding machine B and the female mold 20, so pouring of the foaming strips B of thermoplastic elastomeric gas polymers can be done while maintaining overall structural stability of the thermoplastic elastomeric gas polymer foaming bodies A; in the meantime, sparing a concave cavity 202' in the heel part without affecting stability of the foaming structure of the foaming strips B of thermoplastic elastomeric gas polymers and pouring of the foaming strips B of thermoplastic elastomeric gas polymers is also done within 2-3 seconds, and form an area B; furthermore, ensuring that height of the poured foaming strips B of thermoplastic elastomeric gas polymers is no lower than height of the poured foaming strips A of thermoplastic elastomeric gas polymers, which can avoid effectively collapse of the thermoplastic elastomeric gas polymer foaming bodies A due to reduction of the wall-hanging action; and surfaces of the poured thermoplastic elastomeric gas polymer foaming bodies B appear to be in a arbitrarily superposed state;

After pouring the foaming strips B of thermoplastic elastomeric gas polymers, extruding and pouring quantitatively the foaming strips C of thermoplastic elastomeric gas polymers into an upper part and concave cavity 202' in the heel of the female mold 20, during extrusion, moving the intercepting perforated nozzle of the injection molding machine C and the female mold 20 with a foreign displacement device, so that a relative movement happens between the intercepting perforated nozzle of the injection molding machine C and the female mold 20, completing pouring action of the foaming strips C of thermoplastic elastomeric gas polymers to form an area C, and surfaces of the poured thermoplastic elastomeric gas polymer foaming bodies C appear to be in a arbitrarily superposed state;

S3: after completing pouring of the foaming strips of thermoplastic elastomeric gas polymers of each color classification, matching the female mold and the male mold, discharging gas therein, and shaping to be said foaming sole, and characteristics of finished product group (5) to (8) are shown in Table 6; and as is shown in FIG. 3, in the foaming sole made by foaming in this way, a visual perception of the parts 2A poured correspondingly by the foaming strips A of thermoplastic elastomeric gas polymers is of relatively dense injection strips (about 7-10 lines/cm$^2$); while a visual perception of the parts 2B poured correspondingly by the foaming strips B of thermoplastic elastomeric gas polymers is of injection strips of medium degree of density (about 4-6 lines/cm$^2$); and the visual perception of the parts 2C poured correspondingly by the foaming strips C of thermoplastic elastomeric gas polymers is of injection strips of sparse degree of density (about 1-4 lines/cm$^2$); further, due to configuration of the molds, fairly apparent color dividing lines are formed at a profile of the surrounding wearing sheets; and as a result of self-leveling action of the foaming strips of thermoplastic elastomeric gas polymers, relatively apparent color dividing lines 2* are formed between the lower parts of the sole poured correspondingly with the foaming strips B of thermoplastic elastomeric gas polymers and the upper parts of the sole poured correspondingly by the foaming strips C of thermoplastic elastomeric gas polymers.

TABLE 4

Ingredient content in Embodiment 2

| | Lubricants A | Foaming auxiliaries A | Gas foaming agent A |
|---|---|---|---|
| Group (5) | 2% | 2% | $N_2$ 1% + $CO_2$ 1% + Dimethyl ether 1% |
| Group (6) | 3% | 1.5% | $N_2$ 1% + $CO_2$ 1% + Dimethyl ether 1% |
| Group (7) | 2% | 3.5% | $N_2$ 1% + $CO_2$ 1% + Dimethyl ether 1% |
| Group (8) | 1% | 2.5% | $N_2$ 1% + $CO_2$ 1% + Dimethyl ether 1% |

| | Lubricants B | Foaming auxiliaries B | Gas foaming agent B |
|---|---|---|---|
| Group (5) | 2.5% | 2% | $CO_2$ 3% + Dimethyl ether 1% |
| Group (6) | 2% | 1% | $CO_2$ 2% + Dimethyl ether 2% |
| Group (7) | 3% | 4% | $CO_2$ 5% |
| Group (8) | 1.5% | 5% | Dimethyl ether 4% |

| | Lubricants C | Foaming auxiliaries C | Gas foaming agent C |
|---|---|---|---|
| Group (5) | 3% | 2% | $N_2$ 1% + $CO_2$ 3% |
| Group (6) | 4% | 1% | $N_2$ 1% + $CO_2$ 3% + isopentane 1% |
| Group (7) | 3% | 1% | $N_2$ 2% + $CO_2$ 1% + isopentane 1% |
| Group (8) | 3.5% | 2% | $CO_2$ 3% + isopentane 3% |

TABLE 5

Equipment specifications in Embodiment 2

| | Extrusion temp. of double screw extruder A (° C.) | Outlet pressure of double screw extruder A (MPa) | Temperature of single screw extruder A $T_A$ (° C.) |
|---|---|---|---|
| Group (5) | 220 | 3 | 190 ± 2 |
| Group (6) | 220 | 2 | 185 ± 2 |
| Group (7) | 210 | 3 | 185 ± 2 |
| Group (8) | 210 | 4 | 188 ± 2 |

| | Extrusion temp. of double screw extruder B (° C.) | Outlet pressure of double screw extruder B (MPa) | Temperature of single screw extruder B $T_B$ (° C.) |
|---|---|---|---|
| Group (5) | 220 | 3 | 185 ± 2 |
| Group (6) | 220 | 5 | 185 ± 2 |
| Group (7) | 195 | 5 | 180 ± 2 |
| Group (8) | 190 | 3 | 183 ± 2 |

| | Extrusion temp. of double screw extruder C (° C.) | Outlet pressure of double screw extruder C (MPa) | Temperature of single screw extruder C $T_C$ (° C.) |
|---|---|---|---|
| Group (5) | 200 | 8 | 185 ± 2 |
| Group (6) | 200 | 4 | 185 ± 2 |
| Group (7) | 195 | 4 | 180 ± 2 |
| Group (8) | 190 | 6 | 177 ± 2 |

TABLE 6 product specifications and parameters in Embodiment 2

| | Density of foaming sole part A and A' | Hardness of part A and A' (Shore C) | Deformation rate of part A and A' (%) | Resilience rate of part A and A' (%) | Injection strips Density in part A and A' (line/cm²) | Light fastness of part A and A' | Shock cushioning property G value of part A and A' |
|---|---|---|---|---|---|---|---|
| Group (5) | 0.273 | 45~60 | 24 | 52~68 | 8 | 3-4 | 14 |
| Group (6) | 0.280 | 48~60 | 24 | 52~68 | 9 | 4 | 14.5 |
| Group (7) | 0.258 | 40~60 | 23 | 48~72 | 8 | 4 | 14 |
| Group (8) | 0.262 | 42~60 | 24 | 48~72 | 8 | 3-4 | 13 |

| | Density of foaming sole part B | Hardness of part B (Shore C) | Deformation rate of part B (%) | Resilience rate of part B (%) | Injection strips Density in part B (line/cm2) | Light fastness of part B | Shock cushioning property G value of part B |
|---|---|---|---|---|---|---|---|
| Group (5) | 0.259 | 42~50 | 24 | 52~72 | 3 | 4 | 13 |
| Group (6) | 0.268 | 42~50 | 23 | 52~72 | 3 | 3-4 | 13.5 |
| Group (7) | 0.239 | 40~50 | 22 | 50~75 | 3 | 3-4 | 13 |
| Group (8) | 0.228 | 40~50 | 22 | 50~75 | 2 | 3-4 | 12.5 |

| | Density of foaming sole part C | Hardness of part C (Shore C) | Deformation rate of part C (%) | Resilience rate of part C (%) | Injection strips Density in part C (line/cm2) | Light fastness of part C | Shock cushioning property G value of part C |
|---|---|---|---|---|---|---|---|
| Group (5) | 0.263 | 42~50 | 25 | 52~72 | 3 | 4 | 14.5 |
| Group (6) | 0.272 | 42~50 | 23 | 52~72 | 3 | 4 | 13 |
| Group (7) | 0.270 | 40~50 | 25 | 50~80 | 3 | 4 | 13 |
| Group (8) | 0.248 | 40~50 | 25 | 50~80 | 2 | 4 | 14 |

Embodiment 3

The present invention discloses a manufacturing method of injection molded integral multicolor thermoplastic elastomeric foaming sole, comprising following steps:

In the present embodiment, ingredients of color classification B are as following:
Ingredients of color classification A are as follows:
Thermoplastic elastomer raw materials A: calculating by weight by percentage, TPU (thermoplastic polyolefine elastomer);
Lubricants A: oligomeric fatty acid esters
Foaming auxiliaries A: HFC-245FA
Gas foaming agents A: carbon dioxide, dimethyl ether;
Wherein, addition percentage of the lubricants A, the foaming auxiliaries A and the gas foaming agents A is calculated by total weight of the thermoplastic elastomer raw materials A;
Thermoplastic elastomer raw materials B: TPU (thermoplastic polyolefine elastomer): TPAE (thermoplastic polyester elastomer)=4:1;
Lubricants B: nonpolar PE wax
Foaming auxiliaries B: HFC-245FA
Gas foaming agents B: carbon dioxide and/or heptane;
Wherein, addition percentage of the lubricants B, the foaming auxiliaries B and the gas foaming agents B is calculated by total weight of the thermoplastic elastomer raw materials B;
Ingredients of color classification C are as following:
Thermoplastic elastomer raw materials C: calculated by weight ratio, TPU (thermoplastic polyolefine elastomer):
TPAE (thermoplastic polyester elastomer)=4:1;
Lubricants C: wax;
Foaming auxiliaries C: SaKai F1-90D;
Gas foaming agents C: carbon dioxide and/or heptane and/or nitrogen;
Wherein, addition percentage of the lubricants C, the foaming auxiliaries C and the gas foaming agents C is calculated by total weight of the thermoplastic elastomer raw materials C;
Manufacturing with the foregoing ingredients at a proportion as stipulated in Table 7, equipment specifications in Table 8 and following steps S1 to S3, specifically in the following manner:
S1: sending the thermoplastic elastomer raw materials, the lubricants and the foaming auxiliaries to a double screw extruder A according to specifications of color classification A in Table 7, milling the same in the double screw extruder A to form thermoplastic elastomeric fused mass A, in the meantime, infusing gas foaming agents A into the thermoplastic elastomeric fused mass A in the double screw extruder A according to a volume ratio of the gas foaming agents A and the thermoplastic elastomer A, maintaining hot mixing and forming a polymer-gas dispersoid system A of corresponding color classification;

Sending the thermoplastic elastomer raw materials, the lubricants and the foaming auxiliaries to a double screw extruder B according to specifications of color classification B in Table 7, milling the same in the double screw extruder B to form thermoplastic elastomeric fused mass B, infusing gas foaming agents B into the thermoplastic elastomeric fused mass B in the double screw extruder B according to a volume ratio of the gas foaming agents B and the thermoplastic elastomer B, maintaining hot mixing and forming a polymer-gas dispersoid system B of corresponding color classification;

And sending the thermoplastic elastomer raw materials, the lubricants and the foaming auxiliaries to a double screw extruder C according to specifications of color classification C in Table 7, milling the same in the double screw extruder C to form thermoplastic elastomeric fused mass C, infusing gas foaming agents C into the thermoplastic elastomeric fused mass C in the double screw extruder C according to a volume ratio of the gas foaming agents C and the thermoplastic elastomer C, maintaining hot mixing and forming a polymer-gas dispersoid system C of corresponding color classification;

S2: sending the polymer-gas dispersoid system A in S1 to a single screw extruder A for cutting, cooling and pressurizing to form thermoplastic elastomeric gas foaming polymers A, cooling until the temperature is $T_A$, $T_{MA}-15°$ C.$\leq T_A \leq T_{MA}+20°$ C. ($T_{MA}$ is a melting point of the thermoplastic elastomer raw materials A), sending to an injection molding machine A, and extruding foaming strips A of thermoplastic elastomeric gas polymers at an extruding temperature of $T_A$ and with an intercepting perforated injection nozzle of the injection molding machine a with an area of the injection nozzle 10 mm²;

Sending the polymer-gas dispersoid system B in S1 to a single screw extruder B for cutting, cooling and pressurizing to form thermoplastic elastomeric gas foaming polymers B, cooling until the temperature is $T_B$, $T_{MB}-15°$ C.$\leq T_B \leq T_{MB}+20°$ C. ($T_{MB}$ is a mixed melting point of thermoplastic elastomer raw material B) and sending to an injection molding machine B;

Sending the polymer-gas dispersoid system C in S1 to a single screw extruder C for cutting, cooling and pressurizing to form thermoplastic elastomeric gas foaming polymers C, cooling until the temperature is $T_C$, $T_{MC}-15°$ C.$\leq T_C \leq T_{MC}+20°$ C. ($T_{MC}$ is a mixed melting point thermoplastic elastomer raw material C), sending to an injection molding machine C, and controlling a temperature difference between $T_B$ and $T_C$ to be in a range of ±5° C.

Figure 4:
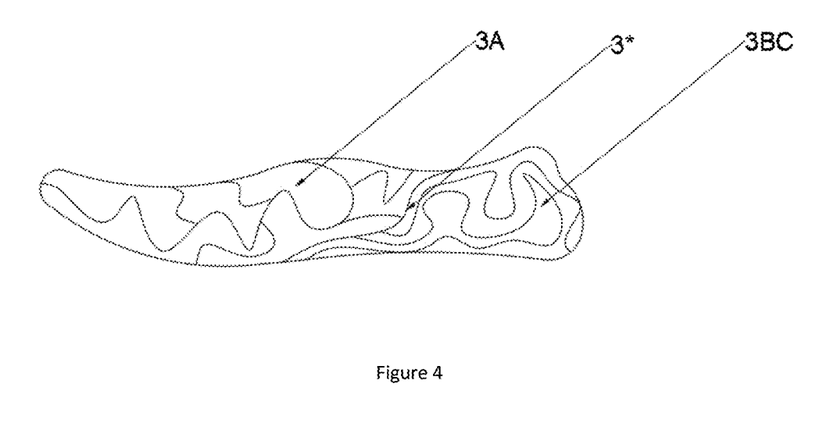
FIG. 4 is a diagram showing a side of the foaming sole according to Embodiment 3 of the present invention.

Supplying the thermoplastic elastomeric gas foaming polymers B and the thermoplastic elastomeric gas foaming polymers C to a laminating machine, and co-extruding the foaming strips BC of mixed thermoplastic elastomeric gas polymers with both color B and color C by an intercepting single hole injection nozzle with an area of injection nozzle 20 mm² with co-extrusion technology;

In the same time, extruding the foaming strips A of thermoplastic elastomeric gas polymers at an extrusion temperature of $T_A$ and with the intercepting perforated injection nozzle of the injection molding machine A 10 mm², and injection the same to a half sole in the female mold; extruding the foaming strips BC of mixed thermoplastic elastomeric gas polymers at an extrusion temperature of $T_{BC}$ and with the intercepting single hole injection nozzle of the laminating machine 20 mm² and injecting the same at a heel part; and after pouring, visually, surfaces of the thermoplastic elastomeric gas polymer foaming bodies BC corresponding to the heel part in the female mold appear to be in a state of multiple arbitrarily superposed overlaying and blending strips of color B and color C;

S3: after pouring the foaming strips of thermoplastic elastomeric gas polymers of each color classification, matching the female mold and the male mold, discharging gas therein, and forming to be the foaming sole, and characteristics of the finished product groups (9) to (11) are shown in Table 9. And as shown in FIG. 4, in the finished foaming sole by foaming in this way, visual effects of the part 3A correspondingly poured by the foaming strips A of thermoplastic elastomeric gas polymers are from the injection strips of a sparse degree of density (about 1-4 lines per cm²); while those of the part 3BC corresponding poured by the foaming strips BC of mixed thermoplastic elastomeric gas polymers are from the injection strips of a relatively dense degree of density (about 4-8 lines per cm²). In the meantime, due to the self-leveling action of the foaming strips of thermoplastic elastomeric gas polymers, there is a quite apparent color dividing line 3\* between the part 3A, which is a half sole correspondingly poured by the foaming strips A of thermoplastic elastomeric gas polymers and the part 3BC, which is a heel correspondingly poured by the foaming strips BC of mixed thermoplastic elastomeric gas polymers; and in the surfaces of the heel part of the sole, there is a visual perception of multiple arbitrarily superposed overlaying and blending strips of color B and color C.

TABLE 7

Ingredient content in Embodiment 3

| | Lubricants A | Foaming auxiliaries A | Gas foaming agent A |
|---|---|---|---|
| Group (9) | 2% | 2% | $CO_2$ 2% + Dimethyl ether 1% |
| Group (10) | 3% | 1.5% | $CO_2$ 2% + Dimethyl ether 1% |
| Group (11) | 2% | 3.5% | $CO_2$ 2% + Dimethyl ether 1% |
| Group (12) | 1% | 2.5% | $CO_2$ 2% + Dimethyl ether 1% |

| | Lubricants B | Foaming auxiliaries B | Gas foaming agent B |
|---|---|---|---|
| Group (9) | 2.5% | 2% | $CO_2$ 3% + heptane 1% |
| Group (10) | 2% | 1% | $CO_2$ 2% + heptane 2% |
| Group (11) | 3% | 4% | $CO_2$ 5% |
| Group (12) | 1.5% | 5% | heptane 4% |

| | Lubricants C | Foaming auxiliaries C | Gas foaming agent C |
|---|---|---|---|
| Group (9) | 3% | 2% | $N_2$ 1% + $CO_2$ 3% |
| Group (10) | 4% | 1% | $N_2$ 1% + $CO_2$ 3% + heptane 1% |

TABLE 7-continued

Ingredient content in Embodiment 3

| Group (11) | 3% | 1% | $N_2$ 2% + $CO_2$ 1% + heptane 1% |
|---|---|---|---|
| Group (12) | 3.5% | 2% | $CO_2$ 3% + heptane 3% |

TABLE 8

Equipment specifications in Embodiment 3

| | Extrusion temp. of double screw extruder A (° C.) | Outlet pressure of double screw extruder A (MPa) | Temperature of single screw extruder A $T_A$ (° C.) |
|---|---|---|---|
| Group (9) | 220 | 3 | 190 ± 2 |
| Group (10) | 220 | 2 | 185 ± 2 |
| Group (11) | 210 | 3 | 185 ± 2 |
| Group (12) | 210 | 4 | 188 ± 2 |

| | Extrusion temp. of double screw extruder B (° C.) | Outlet pressure of double screw extruder B (MPa) | Temperature of single screw extruder B $T_B$ (° C.) |
|---|---|---|---|
| Group (9) | 220 | 3 | 185 ± 2 |
| Group (10) | 220 | 5 | 185 ± 2 |
| Group (11) | 195 | 4 | 180 ± 2 |
| Group (12) | 190 | 3 | 183 ± 2 |

| | Extrusion temp. of double screw extruder C (° C.) | Outlet pressure of double screw extruder C (MPa) | Temperature of single screw extruder C $T_C$ (° C.) |
|---|---|---|---|
| Group (9) | 220 | 3 | 185 ± 2 |
| Group (10) | 220 | 5 | 185 ± 2 |
| Group (11) | 195 | 4 | 180 ± 2 |
| Group (12) | 190 | 3 | 183 ± 2 |

TABLE 9

Product specifications and parameters in Embodiment 3

| | Density of foaming sole part A and A' | Hardness of part A and A' (Shore C) | Deformation rate of part A and A' (%) | Resilience rate of part A and A' (%) | Injection strips Density in part A and A' (line/cm²) | Light fastness of part A and A' | Shock cushioning property G value of part A and A' |
|---|---|---|---|---|---|---|---|
| Group (9) | 0.236 | 40~48 | 23 | 52~76 | 3 | 4 | 13.5 |
| Group (10) | 0.248 | 42~50 | 24 | 50~76 | 3 | 3-4 | 12.5 |
| Group (11) | 0.225 | 40~48 | 23 | 50~78 | 3 | 3-4 | 13.5 |
| Group (12) | 0.245 | 42~50 | 22 | 50~78 | 2 | 3-4 | 12 |

| | Density of foaming sole mixed part BC | Hardness of mixed part BC (Shore C) | Deformation rate of mixed part BC (%) | Resilience rate of mixed part BC (%) | Injection strips Density in mixed part BC (line/cm2) | Light fastness of mixed part BC | Shock cushioning property G value of mixed part BC |
|---|---|---|---|---|---|---|---|
| Group (9) | 0.281 | 45~60 | 25 | 52~68 | 8 | 3-4 | 14 |
| Group (10) | 0.269 | 48~60 | 23 | 52~68 | 9 | 4 | 13.5 |
| Group (11) | 0.252 | 40~60 | 23 | 48~68 | 8 | 4 | 14 |
| Group (12) | 0.259 | 42~60 | 24 | 48~68 | 8 | 3-4 | 14.5 |

In the foregoing embodiments:

Inspection method of density of foaming sole is based on ASTM-D3574;

Inspection method of hardness is based on GB/T 10807-22006;

Inspection method of compressed deformity is based on GB/T 6669-2008;

Inspection method of resilience is based on GB/T 6670-2008;

Inspection method of light fastness is based on DB35/T 1691-2017; and

Inspection of shock cushioning properties is based on GB/T 30907-2014.

In the different settings or components described in the drawings and the foregoing description, components and steps not shown or described are still possible. Similarly, some features and sub-combinations are useful, and can be used without reference to other features and sub-combinations. The embodiments of the present invention are for illustrative purposes, not for limiting the present invention, and alternative embodiments are obvious to readers of this patent. Therefore, the present invention is not limited to the description given above or the drawings, and various implementations and improvements not departing from the protection scope of the appended claims are still possible.

I claim:

1. A manufacturing method of an injection molded integral multicolor thermoplastic elastomeric foamed sole, wherein the foamed sole is of a shape of an integral sole made from thermoplastic elastomeric foaming bodies of at least two color classifications, and on surfaces of the thermoplastic elastomeric foaming bodies of the at least two color classifications are provided grains of a plurality of arbitrarily superposed injection strips; wherein the manufacturing method comprising following steps:

(S1): sending respectively thermoplastic elastomer raw materials of different color classifications, lubricants, and foaming auxiliaries to first milling machines of different color classifications, and milling the same in the first milling machines, forming thermoplastic elastomeric fused masses, in the meantime, adding gas foaming agents into the thermoplastic elastomeric fused masses in the first milling machines, maintain hot mixing and forming polymer-gas dispersoid systems;

(S2): sending polymer-gas dispersoid systems of different color classifications in S1 respectively to second milling machines of corresponding color classifications for cutting, cooling and pressurizing to form thermoplastic elastomeric gas foaming polymers, sending the thermoplastic elastomeric gas foaming polymers to injection molding machines of corresponding color classifications respectively, to have injection nozzles of the injection molding machines to extrude foaming strips of thermoplastic elastomeric gas polymers, and/or have the injection molding machines of at least two color classifications to supply a feeding port of a laminating machine and extrude the foaming strips of thermoplastic elastomeric gas polymers with at least one injection nozzle of the injection molding machines with co-extrusion technology; pouring quantitatively and simultaneously or sequentially the foaming strips of thermoplastic elastomeric gas polymers extruded by different injection nozzles of the injection molding machines into a female mold, and form a status of a plurality of arbitrarily superposed layers; and when pouring quantitatively into the female mold sequentially, temperature difference between the next foaming strips of the thermoplastic elastomeric gas polymers and last foaming strips of the thermoplastic elastomeric gas polymers shall be ±10° C.; and (S3): after completing pouring of the foaming strips of thermoplastic elastomeric gas polymers of each of the different color classifications, matching the female mold and a male mold, discharge gas therein, and finalize to be the foamed sole.

2. The manufacturing method of the injection molded integral multicolor thermoplastic elastomeric foamed sole according to claim 1, wherein the foaming strips of thermoplastic elastomeric gas polymers are consisted of one to seven colors; density of the foamed sole is 0.225-0.280 g/cm$^3$, hardness 40-60 C, and resilience 48%-80%, the first milling machines are double screw extruders, and the second milling machines are single screw extruders.

3. The manufacturing method of the injection molded integral multicolor thermoplastic elastomeric foamed sole according to claim 1, wherein the foaming strips of thermoplastic elastomeric gas polymers are consisted of one to seven colors; density of the foamed sole is 0.225-0.280 g/cm$^3$, hardness 40-60 C, and resilience 48%-80%, wherein in an enclosed cavity formed between the male mold and the female mold, at least two housing cavities for different color classifications of the foamed sole are provided by providing dividing grooves and/or dividing edges and/or dividing protrusions and/or dividing recesses.

4. The manufacturing method of the injection molded integral multicolor thermoplastic elastomeric foamed sole according to claim 1, wherein the foaming strips of thermoplastic elastomeric gas polymers are consisted of one to seven colors; density of the foamed sole is 0.225-0.280 g/cm$^3$, hardness 40-60 C, and resilience 48%-80%, wherein in step (S2) and (S3), pouring of the foaming strips of thermoplastic elastomeric gas polymers of each of the different color classifications is done within 60 s.

5. The manufacturing method of the injection molded integral multicolor thermoplastic elastomeric foamed sole according to claim 1, wherein the foaming strips of thermoplastic elastomeric gas polymers are consisted of one to seven colors; density of the foamed sole is 0.225-0.280 g/cm$^3$, hardness 40-60 C, and resilience 48%-80%, wherein an area of openings of the injection nozzles of the injection machines is 0.5 mm$^2$ to 100 mm$^2$.

* * * * *